US008341355B2

(12) United States Patent
Li et al.

(10) Patent No.: US 8,341,355 B2
(45) Date of Patent: Dec. 25, 2012

(54) REDUCING ENERGY CONSUMPTION OF SET ASSOCIATIVE CACHES BY REDUCING CHECKED WAYS OF THE SET ASSOCIATION

(75) Inventors: Jian Li, Austin, TX (US); William E. Speight, Austin, TX (US); Lixin Zhang, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 219 days.

(21) Appl. No.: 12/787,122

(22) Filed: May 25, 2010

(65) Prior Publication Data

US 2011/0296112 A1 Dec. 1, 2011

(51) Int. Cl.
*G06F 12/00* (2006.01)

(52) U.S. Cl. .......................... 711/128; 711/119; 711/120

(58) Field of Classification Search .................. 711/128, 711/133, E12.001, E12.022, E12.018, 119, 711/120
See application file for complete search history.

(56) References Cited

U.S. PATENT DOCUMENTS

| | | | |
|---|---|---|---|
| 6,446,168 B1 | 9/2002 | Normoyle et al. | |
| 7,177,981 B2 | 2/2007 | Davis | |
| 7,197,605 B2 | 3/2007 | Schmisseur et al. | |
| 7,290,089 B2 | 10/2007 | Parthasarathy et al. | |
| 7,318,127 B2 | 1/2008 | Hrusecky et al. | |
| 7,360,023 B2 | 4/2008 | Goodrich | |
| 7,457,917 B2 | 11/2008 | Damaraju et al. | |
| 7,487,369 B1 | 2/2009 | Gupta et al. | |
| 7,657,708 B2 | 2/2010 | Knoth et al. | |
| 7,680,985 B2 | 3/2010 | Luick | |
| 2008/0040583 A1* | 2/2008 | Kra | 712/220 |
| 2010/0030966 A1* | 2/2010 | Hirao et al. | 711/122 |
| 2010/0082905 A1* | 4/2010 | Wilkerson et al. | 711/122 |
| 2010/0235579 A1* | 9/2010 | Biles et al. | 711/125 |

OTHER PUBLICATIONS

Bhadauria, Major et al., "Leveraging High Performance Data Cache Techniques to Save Power in Embedded Systems", Downloaded from the Internet on Jul. 2, 2010, http://www.hipeac.net/system/files?file=BhadauriaM_hipeac07.pdf, 11 pages.

Gieger, Michael J., "Improving Performance and Energy Consumption in Region-Based Caching Architectures", Dissertation, The University of Michigan, Computer Science and Engineering, 2006, 141 pages.

(Continued)

*Primary Examiner* — Yaima Campos
*Assistant Examiner* — Mehdi Namazi
(74) *Attorney, Agent, or Firm* — Stephen J. Walder, Jr.; Eustus D. Nelson

(57) ABSTRACT

Mechanisms for accessing a set associative cache of a data processing system are provided. A set of cache lines, in the set associative cache, associated with an address of a request are identified. Based on a determined mode of operation for the set, the following may be performed: determining if a cache hit occurs in a preferred cache line without accessing other cache lines in the set of cache lines; retrieving data from the preferred cache line without accessing the other cache lines in the set of cache lines, if it is determined that there is a cache hit in the preferred cache line; and accessing each of the other cache lines in the set of cache lines to determine if there is a cache hit in any of these other cache lines only in response to there being a cache miss in the preferred cache line(s).

19 Claims, 5 Drawing Sheets

OTHER PUBLICATIONS

Giorgi, Roberto et al., "Filtering Drowsy Instruction Cache to Achieve Better Efficiency", ACM 2008, pp. 1554-1555.

Kim, S et al., "Energy-Efficient Instruction Cache Using Page-Based Placement", ACM, 2001, 9 pages.

Powell, Michael D. et al., "Reducing Set-Associative Cache Energy via Way-Prediction and Selective Direct-Mapping", Proceedings of the 34th International Symposium on Microarchitecture (MICRO 34), 2001, 12 pages.

* cited by examiner

REDUCING ENERGY CONSUMPTION OF SET ASSOCIATIVE CACHES BY REDUCING CHECKED WAYS OF THE SET ASSOCIATION

BACKGROUND

The present application relates generally to an improved data processing apparatus and method and more specifically to mechanisms for reducing energy consumption of set associative caches by reducing checked ways of the set association when possible.

As is described in Powell et al., "Reducing Set-Associative Cache Energy via Way-Prediction and Selected Direct-Mapping," Proceedings of the 34th international Symposium on Microarchitecture (MICRO 34), 2001, high performance caches dissipate significant dynamic energy due to charging and discharging of highly capacitive bit lines and sense amps. As a result, caches account for a significant fraction of the overall chip dynamic energy.

A direct mapped cache is one in which data/instructions associated with a particular address may be stored in only one location within the cache. While these caches provide a fastest possible access to the instructions/data assuming that they are in the cache, if the instructions/data are not in the cache, then a cache miss and its associated handling overhead of evicting existing instructions/data in the cache and replacing them with the needed instructions/data from a lower level cache or main memory must be endured. Such cache miss handling significantly slows the performance of the processor. Direct mapped caches, in which there is only one location in the cache where the particular instruction/data for an address may be present, often encounter cache misses.

To achieve lower cache miss rates, modern microprocessors employ set associative caches as opposed to direct mapped caches. In a set associative cache the instructions/data may be stored in multiple locations within the cache, i.e. in an N-way associative cache, the instructions/data may be located in anyone of N locations within the N-way associative cache. Since the instructions/data may be available from multiple locations within the cache, there is a smaller likelihood of a cache miss occurring and thus, the overhead associated with handling a cache miss may be avoided more often. However, with these set associative caches, when a check of the cache is performed to access instructions/data corresponding to an address, all of the possible locations where the instruction/data may be located, i.e. all of the "ways" of the set associative cache, must be checked. Checking more locations in the cache requires more power, chip area, and time.

SUMMARY

In one illustrative embodiment, a method, in a data processing system, is provided for accessing a set associative cache of the data processing system. The method comprises receiving, in the data processing system, a request to access data from the set associative cache of the data processing system, the request specifying an address of the data. The method further comprises identifying, by the data processing system, a set of cache lines in the set associative cache associated with the address. Moreover, the method comprises determining, by the data processing system, whether a mode of operation for the set is a first mode of operation or a second mode of operation. Furthermore, the method comprises, in response to the mode of operation for the set being a first mode of operation, (1) determining if there is a cache hit in a subset of cache lines in the set of cache lines without accessing other cache lines in the set of cache lines; (2) retrieving data from the subset of cache lines in the set of cache lines without accessing the other cache lines in the set of cache lines, if it is determined that there is a cache hit in the subset of cache lines; and (3) accessing each of the other cache lines in the set of cache lines to determine if there is a cache hit in any of these other cache lines only in response to there being a cache miss in the subset of cache lines.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a set associative cache coupled to the one or more processors. The processor(s) may perform various ones, and combinations of, the operations outlined above with regard to the method illustrative embodiment with regard to the set associative cache.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
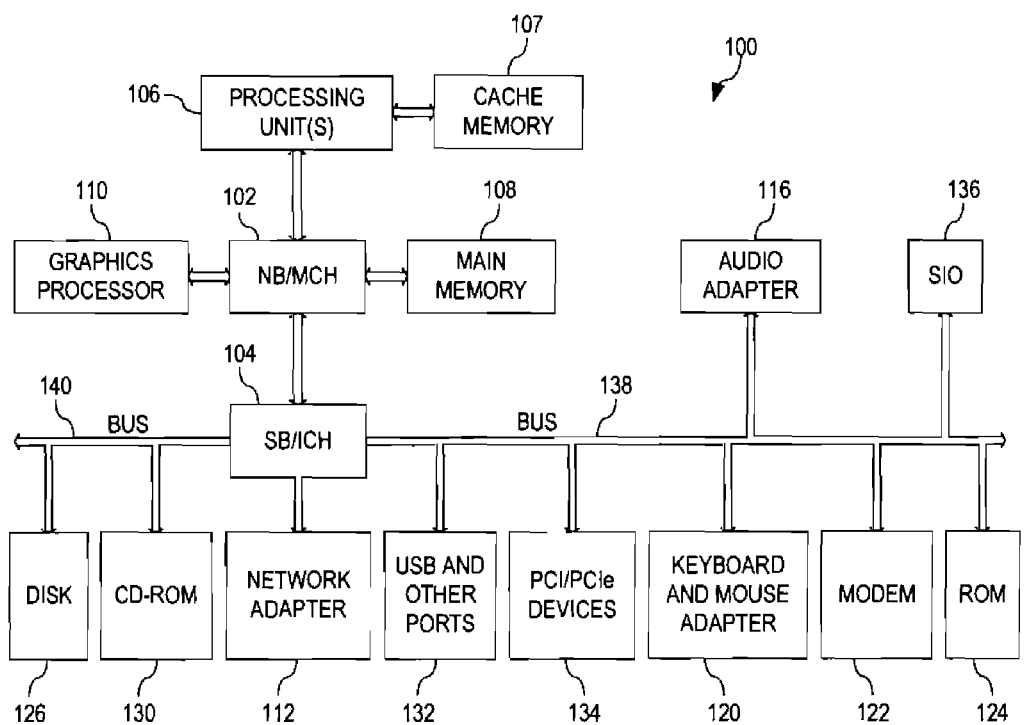
FIG. 1 is an example block diagram of a data processing system in which aspects of the illustrative embodiments may be implemented.

The illustrative embodiments provide a mechanism for reducing energy consumption of set associative caches by reducing checked ways of the set association when possible. The mechanisms of the illustrative embodiments essentially provide a hybrid direct/associative cache mechanism in which modes of operation are supported for determining whether to check a subset of locations or "ways", e.g., cache lines, associated with a set of the set associative cache, or for checking all of the ways of the set associative cache. In one illustrative embodiment, the subset of locations or "ways" is a single preferred location or cache line.

For purposes of the following description, it will be assumed that the subset of locations or "ways" is a single preferred location or cache line. As such, the set associative cache mechanisms of the illustrative embodiments may operate as a hybrid direct/associative cache mechanism where the checking of the preferred location or cache line is akin to the direct caching mechanisms. However, it should be appreciated that the mechanisms of the illustrative embodiments may be extended to embodiments in which the single preferred location or cache line is in fact a subset of locations or cache lines. In such a case, the caching mechanism does not utilize a direct cache mechanism but an associative/associative caching mechanism in which a smaller subset of cache lines is checked first and only if there is not a cache hit in this subset of cache lines will the remaining cache lines in the set be checked.

For example, if an application is known to reuse data, e.g., applications for processing streaming sensor data, biological analysis applications, graph algorithms, or the like, then a "private" mode of operation may be set for checking a single location, e.g., a preferred location or cache line, within a set of the set-associative cache rather than checking all of the locations within the set. If the required data is found at that preferred location, then power savings is achieved by not having to check all of the other locations in the set. However, if the data is not found at the preferred location, the other locations in the set may be checked in a set-associative manner.

A counter may be associated with each set in the hybrid direct/associative cache and may be used to count a number of times that required data is not found in the preferred location of the set. When this counter value exceeds a predetermined value, the mode of operation for the particular set of the hybrid direct/associative cache may be switched from a "private" mode to a "shared" mode. In the "shared" mode, for the particular set, the entire set of the set-associative cache is checked rather than only checking a preferred location within the set. In response to another condition, the mode of operation for the set may be switched back to the "private" mode. This other condition may take many different forms including a timer based condition, a number of times that the required data is found in a preferred location after switch to the "shared" mode of operation meeting a predetermined criteria, a detected increase in the cache miss rate, or the like.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The illustrative embodiments may be utilized in many different types of data processing environments including a distributed data processing environment, a single data processing device, or the like. With reference now to the figures and in particular with reference to FIG. 1, an example diagram of data processing environment is provided in which illustrative embodiments of the present invention may be implemented. It should be appreciated that FIG. 1 is only an example and is not intended to assert or imply any limitation with regard to the environments in which aspects or embodiments of the present invention may be implemented. Many modifications to the depicted environment may be made without departing from the spirit and scope of the present invention.

FIG. 1 is a block diagram of an example data processing system in which aspects of the illustrative embodiments may be implemented. Data processing system 100 is an example of a computer, such as client or server computer, in which computer usable code or instructions implementing the processes for illustrative embodiments of the present invention may be located and in which hardware elements for facilitating the operations of the illustrative embodiments may be provided.

In the depicted example, data processing system 100 employs a hub architecture including north bridge and memory controller hub (NB/MCH) 102 and south bridge and input/output (I/O) controller hub (SB/ICH) 104. Processing unit 106, main memory 108, and graphics processor 110 are connected to NB/MCH 102. Graphics processor 110 may be connected to NB/MCH 102 through an accelerated graphics port (AGP). The processing unit or units 106 may further have one or more associated caches 107 at various cache levels, e.g., L1, L2, or L3 caches, for storing instructions/data for faster access. As is generally known in the art, data and/or instructions may be retrieved from main memory 108 and stored in these caches 107 for quicker access by the processing unit(s) 106. In accordance with illustrative embodiments of the present invention, one or more of these caches 107 may be implemented as a hybrid direct/associative cache utilizing the mechanisms of the illustrative embodiments described hereafter.

In the depicted example, local area network (LAN) adapter 112 connects to SB/ICH 104. Audio adapter 116, keyboard and mouse adapter 120, modem 122, read only memory (ROM) 124, hard disk drive (HDD) 126, CD-ROM drive 130, universal serial bus (USB) ports and other communication ports 132, and PCI/PCIe devices 134 connect to SB/ICH 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash basic input/output system (BIOS).

HDD 126 and CD-ROM drive 130 connect to SB/ICH 104 through bus 140. HDD 126 and CD-ROM drive 130 may use, for example, an integrated drive electronics (IDE) or serial advanced technology attachment (SATA) interface. Super I/O (SIO) device 136 may be connected to SB/ICH 104.

An operating system runs on processing unit 106. The operating system coordinates and provides control of various components within the data processing system 100 in FIG. 1. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 100 (Java is a trademark of Sun Microsystems, Inc. in the United States, other countries, or both).

As a server, data processing system 100 may be, for example, an IBM® eServer™ System P® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 100 may be a symmetric multiprocessor (SMP) system including a plurality of processors in processing unit 106. Alternatively, a single processor system may be employed.

Instructions for the operating system, the object-oriented programming system, and applications or programs are located on storage devices, such as HDD 126, and may be loaded into main memory 108 for execution by processing unit 106. The processes for illustrative embodiments of the present invention may be performed by processing unit 106 using computer usable program code, which may be located in a memory such as, for example, main memory 108, ROM 124, or in one or more peripheral devices 126 and 130, for example.

A bus system, such as bus 138 or bus 140 as shown in FIG. 1, may be comprised of one or more buses. Of course, the bus system may be implemented using any type of communication fabric or architecture that provides for a transfer of data between different components or devices attached to the fabric or architecture. A communication unit, such as modem 122 or network adapter 112 of FIG. 1, may include one or more devices used to transmit and receive data. A memory may be, for example, main memory 108, ROM 124, or a cache such as found in NB/MCH 102 in FIG. 1.

Those of ordinary skill in the art will appreciate that the hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the illustrative embodiments may be applied to a multiprocessor data processing system, other than the SMP system mentioned previously, without departing from the spirit and scope of the present invention.

Moreover, the data processing system 100 may take the form of any of a number of different data processing systems including client computing devices, server computing devices, a tablet computer, laptop computer, telephone or other communication device, a personal digital assistant (PDA), or the like. In some illustrative examples, data processing system 100 may be a portable computing device which is configured with flash memory to provide non-volatile memory for storing operating system files and/or user-generated data, for example. Essentially, data processing system 100 may be any known or later developed data processing system without architectural limitation.

In accordance with the illustrative embodiments of the present invention, one or more of the caches 107 of the data processing system 100 may make use of a hybrid direct/associative cache that implements the mechanisms of the illustrative embodiments for reducing power consumption of the cache by utilizing direct map cache techniques when possible, switching to set associative cache techniques when necessary, and then switching back to direct map cache techniques when possible. In this way, the power savings associated with direct map caches is achieved for the majority of cache accesses while the lower cache miss benefits of set associative caches is utilized when necessary to minimize cache misses. As a result, the overall power consumption of the cache is reduced when compared to known set associative caches while reducing the instances of cache misses when compared to direct mapped caches.

In order to achieve these benefits, a cache 107 of the data processing system is configured as a set associative cache. In a set associative cache, each piece of data or each instruction may be present in one of a plurality of cache locations within the set. Each thread of execution in the processor or processors sharing the cache 107 may have an associated preferred location ("way"), or subset of possible ways, that is the designated location where cache checks are performed first when the set of the cache is being accessed by a thread in a "private" or direct mapped mode of operation. If the required data is present in this preferred location, no further checks of remaining locations in the set are performed. If the data is not present in the preferred location, then checks of the remaining locations may be performed in a set associative cache manner with subsequent cache miss handling if the required data is not present in any of the locations. If the data is present in the preferred location or the other locations in the set, then the data is retrieved from the cache and utilized by the processor 106.

Each set has an associated mode bit associated with it that is set to indicate which mode of operation is associated with the set in the set associative cache. This mode bit may be set to either a "private" or direct mapped mode setting or a "shared" or set associative mode setting. Each set further has an associated saturating counter used to switch the setting of the mode bit for the set. That is, initially, the mode of operation of the set is set to a "private" or direct mapped mode of operation. In response to the required data being present in a non-preferred location of the set, the saturating counter for the set may be incremented. In response to the required data being present in the preferred location for the thread, the saturating counter may be decremented. When the saturating counter for the set reaches a predetermined threshold value, the mode of operation for the set may be switched from a "private" mode to a "shared" mode. When the saturating counter falls back below the predetermined threshold value, the mode of operation for the set may be switched back from the "shared" mode to the "private" mode.

When a thread attempts to access the cache, the address for the data is processed in a normal fashion to identify the set in the set associative cache that is being targeted. Thereafter, the cache controller determines whether the mode bit for the set indicates that the set is currently operating in a private mode or shared mode of operation. If the set's mode bit indicates a private mode of operation, then a preferred location for the thread is first checked for the required data. The preferred location for the thread may be specified in a preferred location data structure, may be a predetermined location in a sequence of locations for each set, e.g., the first location of each set is the preferred location for thread 1, the second location of each set is the preferred location of thread 2, etc., or may be specified in any other manner determined to be appropriate for the particular implementation.

Again, it should be appreciated that while the illustrative embodiments are described herein as checking only a single preferred location or cache line first in a direct mapped cache manner, the illustrative embodiments are not limited to such. Rather, instead of a single preferred location or cache line, a subset of preferred locations or cache lines may be used. For example, there may be 2 preferred locations or cache lines assigned for each of 4 threads in the data processing system with a maximum number of threads being 4 and a set associativity thus being 8. All of the preferred locations or cache lines in the subset of preferred locations/cache lines may be checked in a similar manner as the preferred location described herein with subsequent checking of the remaining locations/cache lines in the set being performed in response to a cache miss in the subset of preferred locations/cache lines.

The preferred location is checked against the tag in the address of the data that is required to determine if the same tag is present in the preferred location. If so, then the data at an offset specified in the address is retrieved and used by the processor executing the corresponding thread. No further checks of the other locations in the set are required. As a result, the power associated with having to search the remaining locations is conserved.

If the tag in the preferred location does not match the tag of the required data, then the other locations in the set may be searched and their tags compared against the tag of the address to determine if any of the locations store the required data. If one of the locations stores the required data, then the data is retrieved from an offset into the location, specified by the address, and then used by the processor executing the thread requesting the data. If none of these locations store the required data, then a cache miss has occurred and cache miss handling is performed. This cache miss handling involves retrieving the required data from a lower level cache or main memory and then placing it in a location within the set in the cache. The particular location chosen depends on the cache's eviction/replacement policy. For example, many caches use a least recently used (LRU) eviction/replacement policy which evicts the least recently used location in the set and replaces it with the data retrieved from the main memory. Some caches use first-in-first-out replacement policy (FIFO) which evicts the location with the oldest data. Other caches use a variant of LRU known as Tree-LRU that allows for a more efficient but less precise implementation of LRU to be used. Other types of eviction/replacement policies may be used as well without departing from the spirit and scope of the illustrative embodiments.

In one illustrative embodiment, as described in greater detail hereafter, the location where the data is placed in the set within the cache may be selected based on whether the mode of operation for the set is a private mode or shared mode. In a private mode of operation, the replacement policy may select the preferred location as the location where the new data retrieved from the main memory is placed. Alternatively, the replacement policy may use a combination of LRU and preferred location. For example, the replacement policy may choose the preferred location if the preferred location is within "X" LRU locations within the set and chooses the LRU location if the preferred location is not within X LRU locations within the set. In a N-way set associative way, "X" may be at any value from 2 to N−1, for example. In a shared mode of operation, a least recently used scheme may be employed, or other suitable replacement policy may be utilized for shared mode of operation sets.

If the mode bit for the set indicates that the set is currently operating in a shared mode, when a thread needs to access the cache to obtain data, all of the locations in the set are checked for the tag associated with the address of the requested data in a normal set associative manner. That is, in the private mode of operation, the preferred location for the thread is checked first and only if the required data is not in the preferred location are the other locations in the set searched. To the contrary, in the shared mode of operation, all of the locations are checked initially. Thus, there is no power savings in shared mode, but the speed at which the data is accessed is faster than in the private mode since in shared mode, the system does not have to wait for the check of the preferred location to result in a miss before checking the other locations. In addition, there is also the benefit of reducing the number of cache misses as normally occurs with a set associative cache.

In the private mode of operation, a saturating counter associated with the set is incremented/decremented based on whether there is a cache hit with regard to the preferred location and the other locations for the thread requesting the data. If there is a cache hit at the preferred location, then the counter value is decremented. If there is a cache miss at the preferred location and the miss hits at one of the other locations, then the counter value is incremented. When the counter value exceeds a predetermined threshold, the mode bit associated with the set is set to a value indicative of a shared mode of operation. When the counter value falls back to the predetermined threshold, the mode bit is reset to a value indicative of a private mode of operation.

Alternatively, the counter may be incremented or decremented only while the set is in the private mode and when the mode has been set to a shared mode, the shared mode is permitted to continue for a predetermined amount of time, e.g., processor cycles, or a predetermined number of cache accesses, or the like, at which time the mode is switched back to a private mode and the counter reset. Other mechanisms for transitioning back from a shared mode of operation to the private mode of operation may be used without departing from the spirit and scope of the illustrative embodiments.

Figure 2:
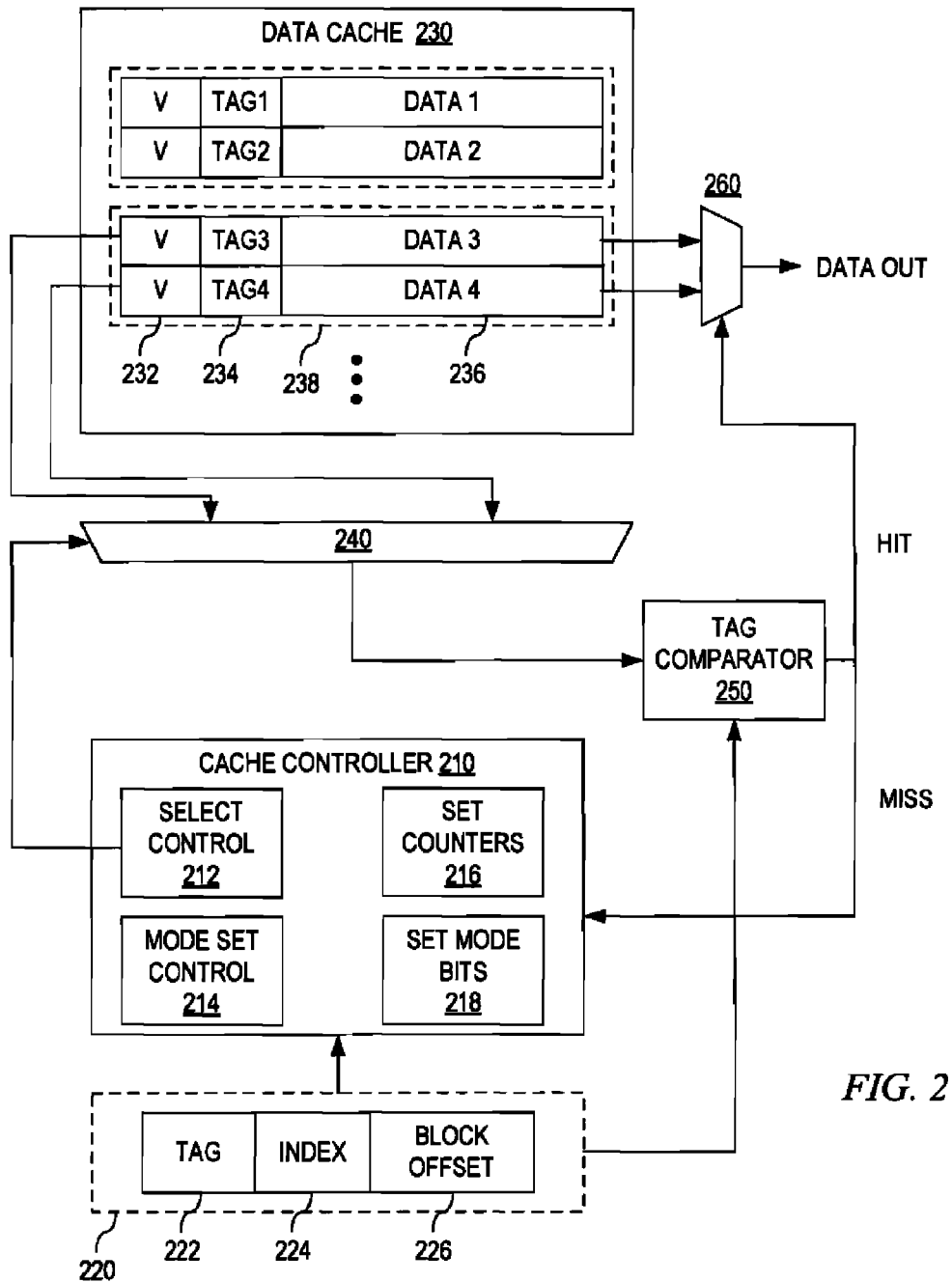
FIG. 2 is a block diagram of a hybrid/associative cache in accordance with one illustrative embodiment.

FIG. 2 is a block diagram of a hybrid direct/associative cache in accordance with one illustrative embodiment. The elements shown in FIG. 2 may be implemented in hardware, software, or any combination of hardware and software. For example, in one illustrative embodiment, the cache controller 210, tag comparator 250, and multiplexer 240 functionality may be implemented as software instructions, such as in a software managed cache mechanism, executing on one or more processors, co-processors, or dedicated special purpose devices, for performing the functionality of the illustrative embodiments. Alternatively, these devices may be implemented in hardware circuitry using various logic elements, wires, and the like.

As shown in FIG. 2, the hybrid direct/associative cache mechanism 200 of one illustrative embodiment includes a cache controller 210 that comprises logic (either hardware or software logic, or both) that manages the data cache 230. The data cache 230 is configured as a set associative data cache in which a plurality of sets 238 of cache lines are provided. Each set may have a separate cache line for each thread that is executing in the processor(s) of the data processing system in which the hybrid direct/associative cache is implemented. In the depicted example, a 2-way set associative cache is shown in which 2 threads may be executing in the data processing system simultaneously. While FIG. 2 shows the sets being organized with cache fines of the set being adjacent to each other, this is only for simplicity of the drawing and, in actuality, the cache lines of a set may in fact be spread out throughout the data cache 230.

The cache controller 210 comprises select control logic 212, mode set control logic 214, set counters 216, and set mode bits 218, among other conventional cache controller logic (not shown). The cache controller 210 receives an address 220 as input and uses the index 224 of the address as a way to identify the particular set 238 being targeted by the address 220. The select control logic 212 provides a select signal to the multiplexer logic 240 for selecting one or more of the cache lines in the set 238 for output to a tag comparator 250. In particular, the select control 212 may send select signals based on the current mode indicated by the mode bits for the particular set, as identified by the set mode bits 218.

The select control logic 212 may retrieve the current state of the set mode bits 218 for the particular set identified by the index 224. If the mode bit 218 indicates a private mode of operation for the set, then a preferred location for the particular thread that provided the address 220 is selected by the select control logic 212 which sends a corresponding select signal to the multiplexer logic 240. If the mode bit 218 indicates a shared mode of operation for the set, then all of the locations in the set may be selected, by providing appropriate output signals to the multiplexer logic 240, to provide output to the tag comparator 250. For example, a bitmask may be used that contains a bit for each possible simultaneous thread executing in the data processing system and corresponding bits may be set/reset by the select controller 212 to control the select signals output to the multiplexer logic 240.

Based on the select signal from the select control logic 212, the multiplexer logic 240 provides a valid bit 232 and tag 234 from the selected cache line in the set to the tag comparator 250. The tag comparator 250 also receives the tag 222 from the input address 220 and compares the tags 234 and 222 to determine if there is a match. If there is a match and the cache line is valid as indicated by the valid bit 232, then a cache hit has occurred in the selected cache line. If either the cache line is invalid or there is not a match, then a cache miss has occurred. If a cache hit occurs, this is signaled to the multiplexer logic 260 which outputs the data from the selected cache line based on the block offset 226 in the original address 220. If there is a cache miss, the cache miss is signaled to the cache controller 210 which then determines whether to check the other cache lines in the set, assuming that the mode is set to a private mode, or perform cache miss handling to retrieve the required data from main memory and place it into a location within the set in the cache 230.

The set counters 216 may be incremented or decremented based on the current mode setting for the set and whether or not a cache hit or miss occurs. For example, in private mode, if there is a cache hit in the preferred location, the corresponding counter for the set may be decremented. If there is a cache hit in one of the other locations during private mode, then the corresponding counter may be incremented. Alternatively, incrementing and decrementing may also occur during shared mode, such as previously mentioned above. The mode set control logic 214 sets the mode bits of the various cache sets based on the state of the corresponding set counters 216. For example, when a set's counter exceeds a predetermined threshold, then the mode set control logic 214 may set a corresponding mode bit 218 for the set to indicate that the mode of operation for the set is a shared mode. Likewise, if the counter value falls below the predetermined threshold, then the mode set control 214 may set the corresponding mode bit 218 for the set to indicate that the mode of operation for the set is a private mode.

Figure 3A:
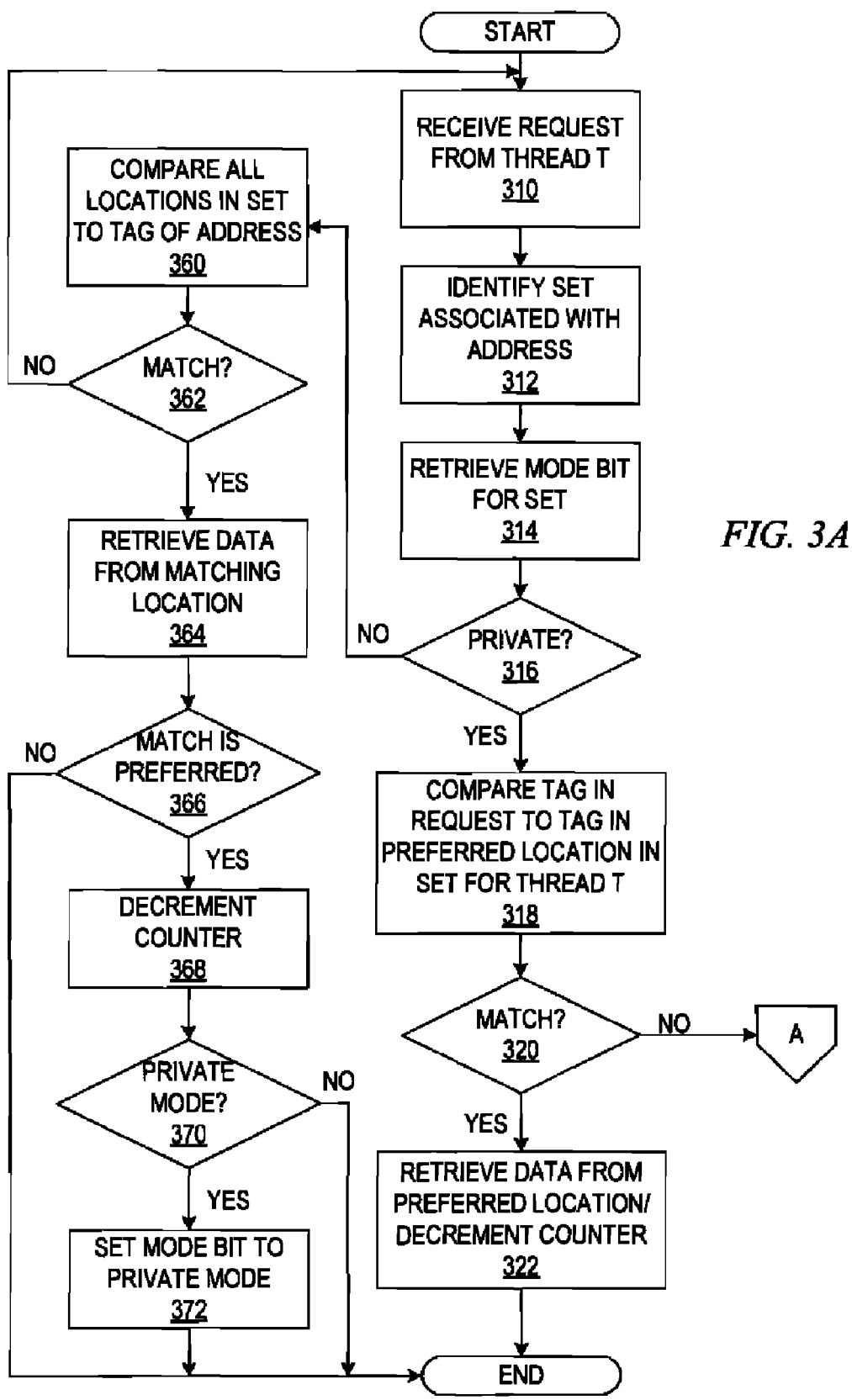
FIGS. 3A and 3B illustrate a flowchart outlining an example operation for performing a hybrid direct/associative cache mechanism in accordance with one illustrative embodiment.
Figure 3B:
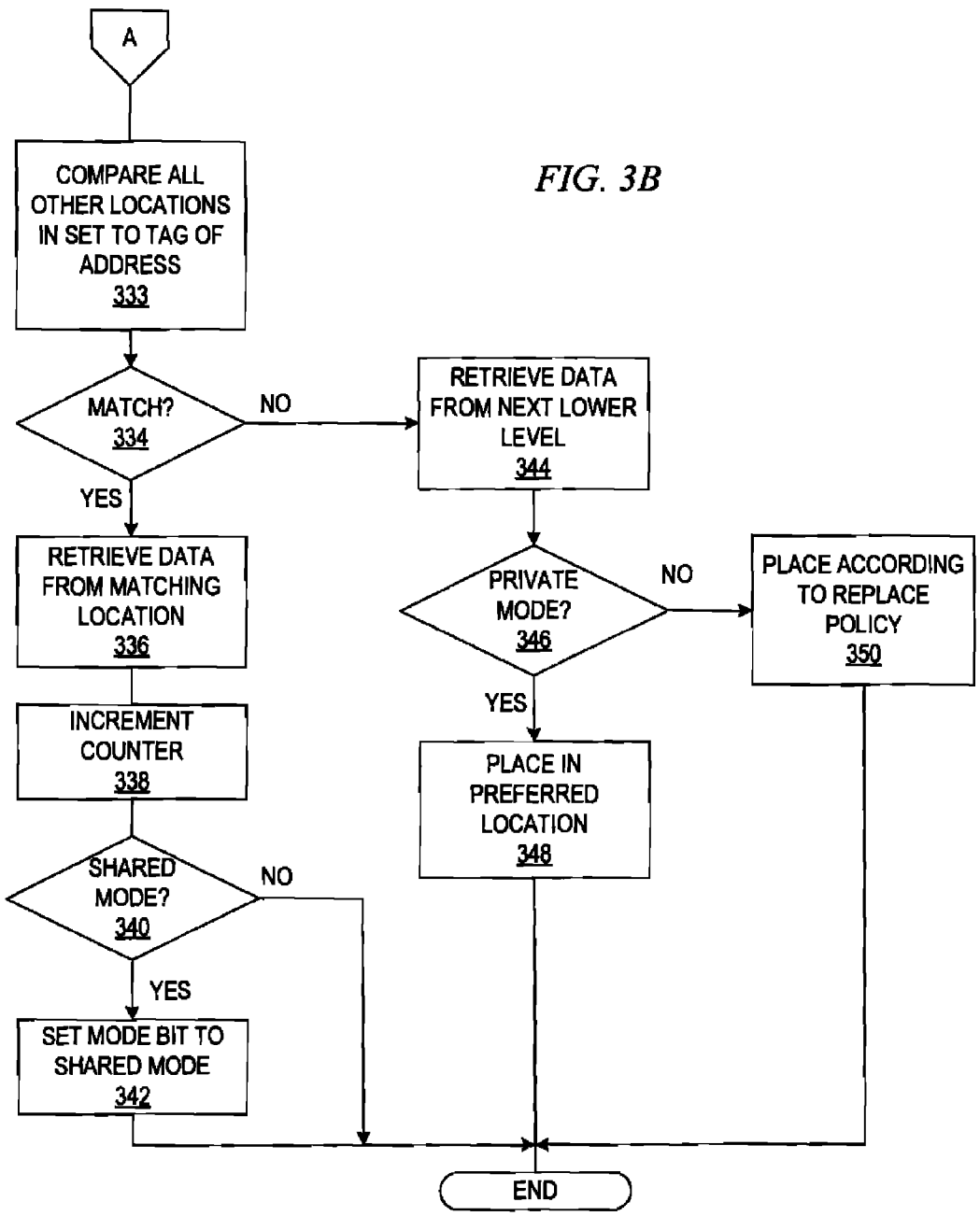

FIGS. 3A and 3B illustrate a flowchart outlining an example operation for performing a hybrid direct/associative cache mechanism in accordance with one illustrative embodiment. The operation outlined in FIGS. 3A and 3B may be performed, for example, by a cache controller operating on a cache configured as a set associative cache, such as the cache and cache controller shown in FIG. 2. It should be appreciated that while the operation shown in FIGS. 3A and 3B is shown as having a termination point, this operation may be repeated any number of times for any number of cache accessed by one or more threads executing in the data processing system.

As shown in FIGS. 3A and 3B, the operation starts with a request, from a thread T, to access a portion of data in the cache specified by an address (step 310). A set associated with the specified address is identified (step 312) and a corresponding mode bit value is retrieved from the mode bit associated with the set (step 314). A determination is made as to whether the mode bit indicates that the mode of operation for the set is a private mode or not (step 316). If the mode bit indicates private mode, the tag from the address specified in the request is compared to a tag of a preferred location or set of locations in the set for the thread T (step 318). A determination is made as to whether the tags match and the location is valid (step 320). If so, then the data is read from the preferred location according to an offset specified in the address of the request (step 322). The operation then terminates.

If the tags do not match, or the location is invalid (step 320), then all of the tags for the other locations in the set are compared against the tag in the address of the request (step 333). A determination is made as to whether any of these tags of these locations in the set match and are valid (step 334). If so, then the data is retrieved from the matching valid location based on the offset specified in the address of the request (step 336). Then the set counter for the set is incremented (step 338). A determination is then made as to whether the counter value indicates a need to transition the mode of operation for the set, e.g., the counter value is greater than a predetermined threshold, has reached a maximum value (step 340), if so, the mode for the set is switched to shared mode of operation (step 342). Thereafter, or if the change in the mode is not necessary, the operation then terminates.

If the determination is made that the mode of operation for the set is a shared mode (step 316), then all of the tags for all of the locations in the set are compared against the tag in the address of the request (step 360). A determination is made as to whether any of these tags of these locations in the set match and are valid (step 362). If so, then the data is retrieved from the matching valid location based on the offset specified in the address of the request (step 364).

A determination is then made as to whether the matching location is the preferred location (step 366). If so, the counter for the set is decremented (step 368). A determination is then made as to whether the counter value indicates a need to transition the mode of operation for the set, e.g., the counter value falls back below a predetermined threshold (step 370), if so, the mode for the set is switched to private mode of operation (step 372). Thereafter, or if the change in the mode is not necessary, the operation then terminates.

If none of these locations in the set have a matching tag, or if all locations having matching tags are invalid, then cache miss handling is invoked with retrieval of the requested data from a next lower level memory structure (lower level cache or main memory) (step 344). A determination is made as to whether the mode of operation is a private mode of operation or not (step 346). If the mode of operation is private, then the data retrieved from the next lower level is placed in the preferred location for the thread (step 348). If the operation is not private, i.e. it is a shared mode of operation, then the data is placed in a location in the set according to the set associative cache replacement policy being used by the cache, e.g., least recently used (LRU) or the like (step 350). The operation may then return to step 310 and repeat with the data now being placed in a proper location within the set in the cache.

Thus, with the mechanisms of the illustrative embodiments, a hybrid approach to checking the sets of a set associative cache is provided such that a hybrid direct/associative cache is made possible. With this hybrid approach, when a set is operating in a private mode, a preferred location for the thread attempting to access the cache is first checked and only if the required data is not present in this preferred location are the other locations of the set checked. In this way, when the data is present in the preferred location, the power consumption associated with checking all of the locations for the set in the cache is avoided and thus, power savings is made possible. If the data is not present in the preferred location, then all of the other locations for the set are checked thereby minimizing cache misses. When it is apparent that data is likely not to be in the preferred location, as determined by a counter mechanism or the like, then a shared mode of operation may be used for the set that causes the cache mechanisms to operate as a normal set associative cache. Mechanisms for transitioning back and forth between modes of operation are made possible so as to achieve the optimum performance/power consumption trade off with regard to searching the set associative cache for requested data.

Figure 4:
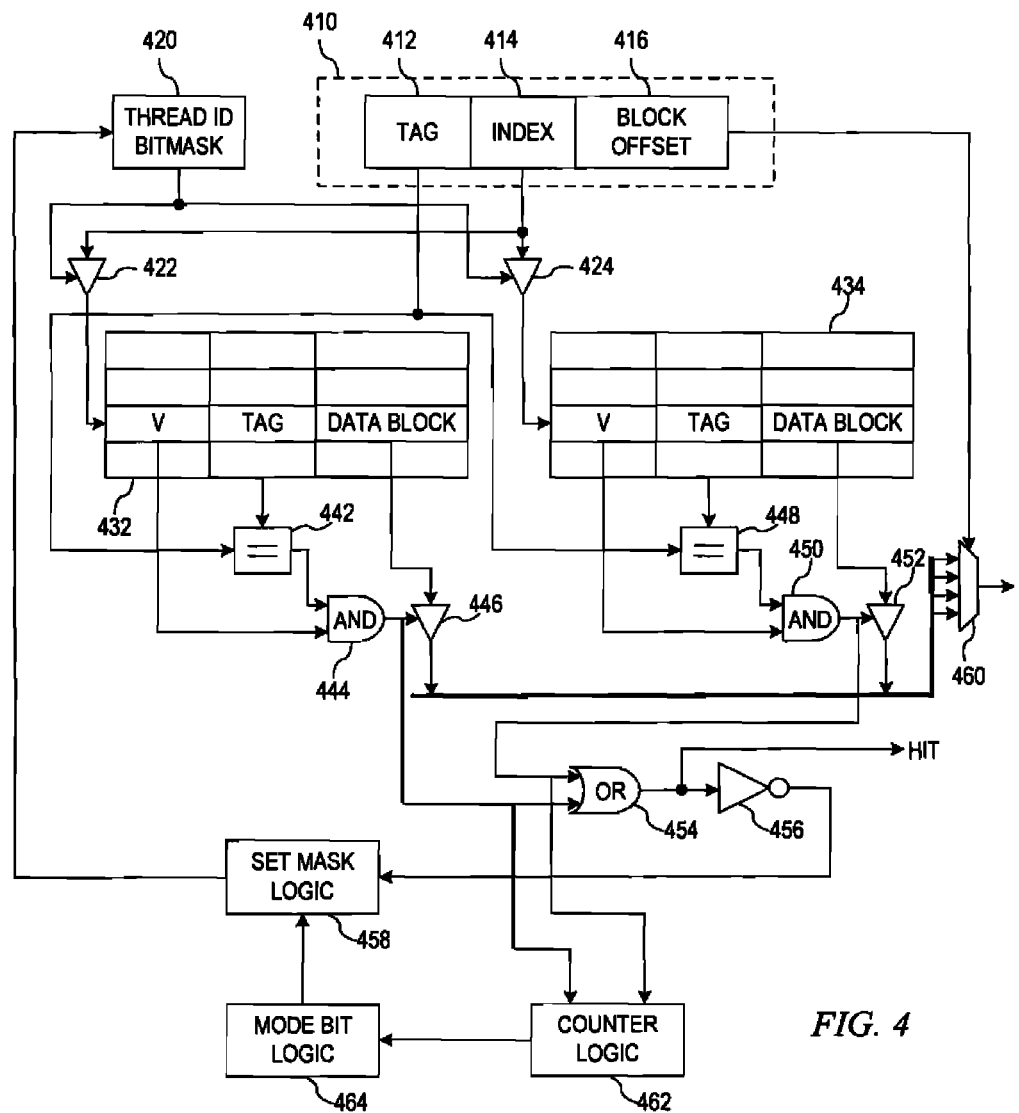
FIG. 4 is an example diagram illustrating a circuit diagram for one example implementation of the hybrid direct/associative cache mechanism for a 2-way set associative caching scheme in accordance with one illustrative embodiment.

FIG. 4 is an example diagram illustrating a circuit diagram for one example implementation of the hybrid direct/associative cache mechanism for a 2-way set associative caching scheme in accordance with one illustrative embodiment. With this example implementation, a thread identifier bitmask 420 is used as a basis for specifying whether to look at a preferred location in the set in the cache or to look at all locations in the set. The thread identifier bitmask 420 may contain a bit for each possible simultaneously executing thread. If a thread's bit is set in the thread identifier bitmask 420, then the location in the set associated with that thread is checked. Thus, if the set is to operate in a private mode, only one bit in the thread identifier bitmask 420 is set. If the mode of operation for the set is a shared mode, then all of the bits in the thread identifier bitmask 420 may be set.

As shown in FIG. 4, the address 410 is input to the circuitry along with a thread identifier bitmask 420. Each bit in the thread identifier bitmask 420 is provided to a couple different gate elements 422 and 424, which may be tri-state logic gates operating as switches, for example, along with an index 414 from the address 410. If the bit in the thread identifier bitmask is set, then the corresponding comparator 422, 424 outputs the index value 414 to a thread specific portion of the cache 432, 434. The index 414 indexes into the thread specific portion of the cache 432, 434 to identify a cache line in the cache. Cache lines in the cache corresponding to the index 414 together constitute a set in the set associative cache structure.

For those threads whose thread identifier bitmask bits 420 are set, the tags from the corresponding cache lines in the thread specific portions of the cache 432, 434 are provided to a comparator 442, 448 and are compared to the tag 412 in the address 410. The result is and-ed by AND gates 444 and 450 with the valid bits of the cache lines as shown. As a result, if there is a match between the tag 412 and the cache line and the valid bit indicates the cache line to be valid, the AND gate 444, 450 outputs a high logic state value signal to gate element 446, 452. If there is not a match, then a low logic state value signal is output to the gate element 446, 452. The output from the AND gates 444 and 450 are also provided to OR gate 454. If either of these AND gates 444 and 450 outputs a logic high state signal, then the OR gate 454 outputs a logic high signal indicating a cache hit. Otherwise, if neither input to the OR gate 454 is a logic high signal, then the OR gate 454 outputs a logic low signal indicating a cache miss.

The outputs from the AND gate 444 and 450 are also provided to counter logic 462. If the inputs to the counter logic 462 indicate that it is a hit in one of the non-preferred location, then the counter logic increments a corresponding counter. If the inputs to the counter logic 462 indicate that it is a hit in the preferred location, then the counter logic decrements a corresponding counter. The counter value is then output to mode bit logic 464 which determines whether a mode change is in order based on the counter value. If so, the mode bit logic 464 provides a signal to the set mask logic 458 indicating a change in the setting of the bits in the thread identifier bitmask 420. For example, the set mask logic 458 may change the thread identifier bitmask 420 so that all of the bits in the bitmask are set in response to a signal from the mode bit logic indicating that the mode of operation for the set is shared or if there was a miss in the preferred location of the thread.

Thus, as shown in FIG. 4, a hardware implementation of the mechanisms of the illustrative embodiments requires relatively small amount of additional circuitry required to implement the hybrid direct/associative cache mechanisms. While only a 2-way set associative cache is shown in FIG. 4, it can be appreciated by those of ordinary skill in the art in view of the present description how the mechanisms shown in FIG. 4 may be extended to implement any number of ways, e.g., 4-way set associative caches, or the like.

Furthermore, as noted above, it should be appreciated that the illustrative embodiments may take the form of an entirely hardware embodiment, such as shown in FIG. 4, an entirely software embodiment, or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for accessing a set associative cache of the data processing system, comprising:

receiving, in the data processing system, a request to access data from the set associative cache of the data processing system, the request specifying an address of the data;

identifying, by the data processing system, a set of cache lines in the set associative cache associated with the address;

determining, by the data processing system, whether a mode of operation for the set is a first mode of operation or a second mode of operation;

wherein determining whether the mode of operation for the set is the first mode of operation or the second mode of operation is performed by retrieving a mode bit value, of a mode bit corresponding to the set, from a mode bit storage device; and in response to the mode of operation for the set being the first mode of operation, the data processing system:

determines if there is a cache hit in a subset of cache lines in the set of cache lines without accessing other cache lines in the set of cache lines;

retrieves data from the subset of cache lines in the set of cache lines without accessing the other cache lines in the set of cache lines, if it is determined that there is a cache hit in the subset of cache lines; and accesses each of the other cache lines in the set of cache lines to determine if there is a cache hit in any of these other cache lines only in response to there being a cache miss in the subset of cache lines.

2. The method of claim 1, wherein the subset of cache lines is a single preferred cache line.

3. The method of claim 1, wherein the subset of cache lines is a subset of preferred cache lines associated with a thread of execution from which the request to access data is received.

4. The method of claim 1, further comprising, in response to the mode of operation for the set being the second mode of operation:

determining if there is a cache hit in any one of all of the cache lines in the set of cache lines;

retrieving data from a cache line in the set of cache lines for which a cache hit is determined; and retrieving the data from a lower level memory structure in response to a cache hit not being determined for any of the cache lines in the set of cache lines.

5. The method of claim 4, wherein the data retrieved from the lower level memory structure is placed in the subset of cache lines in response to the mode of operation being the first mode of operation, and wherein the data retrieved from the lower level memory structure is placed according to a replacement policy of the set associative cache in response to the mode of operation being the second mode of operation.

6. The method of claim 1, wherein the mode bit is set based on a number of times that requests for accessing data from the set associative cache results in the requested data being found in the subset of cache lines in the set of cache lines.

7. The method of claim 6, wherein the mode bit is set to a mode bit value corresponding to the first mode in response to the number of times being less than a threshold value, and wherein the mode bit is set to a mode bit value corresponding to the second mode in response to the number of times exceeding a threshold value.

8. The method of claim 1, wherein the mode bit is set based on a counter value associated with the set of cache lines, wherein the counter value is incremented in response to requested data for received requests to access data from the set associative cache not being present in the subset of cache lines, and wherein the counter value is decremented in response to requested data for received requests to access data from the set associative cache being present in the subset of cache lines.

9. The method of claim 1, wherein the mode bit is set to a mode bit value corresponding to the first mode in response to the counter value being less than a threshold value, and wherein the mode bit is set to a mode bit value corresponding to the second mode in response to the counter value exceeding a threshold value.

10. A computer program product comprising a non-transitory computer readable storage medium having a computer readable program stored therein, wherein the computer readable program, when executed on a computing device, causes the computing device to:
receive a request to access data from the set associative cache of the data processing system, the request specifying an address of the data;
identify a set of cache lines in the set associative cache associated with the address;
determine whether a mode of operation for the set is a first mode of operation or a second mode of operation;
wherein determining whether the mode of operation for the set is the first mode of operation or the second mode of operation is performed by retrieving a mode bit value, of a mode bit corresponding to the set, from a mode bit storage device; and
in response to the mode of operation for the set being the first mode of operation:
determine if there is a cache hit in a subset of cache lines in the set of cache lines without accessing other cache lines in the set of cache lines;
retrieve data from the subset of cache lines in the set of cache lines without accessing the other cache lines in the set of cache lines, if it is determined that there is a cache hit in the subset of cache lines; and
access each of the other cache lines in the set of cache lines to determine if there is a cache hit in any of these other cache lines only in response to there being a cache miss in the subset of cache lines.

11. The computer program product of claim 10, wherein the subset of cache lines is a single preferred cache line.

12. The computer program product of claim 10, wherein the subset of cache lines is a subset of preferred cache lines associated with a thread of execution from which the request to access data is received.

13. The computer program product of claim 10, wherein, in response to the mode of operation for the set being the second mode of operation, the computer readable program further causes the computing device to:
determine if there is a cache hit in any one of all of the cache lines in the set of cache lines;
retrieve data from a cache line in the set of cache lines for which a cache hit is determined; and
retrieve the data from a lower level memory structure in response to a cache hit not being determined for any of the cache lines in the set of cache lines.

14. The computer program product of claim 13, wherein the data retrieved from the lower level memory structure is placed in the subset of cache lines in response to the mode of operation being the first mode of operation, and wherein the data retrieved from the lower level memory structure is placed according to a replacement policy of the set associative cache in response to the mode of operation being the second mode of operation.

15. The computer program product of claim 10, wherein the mode bit is set based on a number of times that requests for accessing data from the set associative cache results in the requested data being found in the subset of cache lines in the set of cache lines.

16. The computer program product of claim 15, wherein the mode bit is set to a mode bit value corresponding to the first mode in response to the number of times being less than a threshold value, and wherein the mode bit is set to a mode bit value corresponding to the second mode in response to the number of times exceeding a threshold value.

17. The computer program product of claim 10, wherein the mode bit is set based on a counter value associated with the set of cache lines, wherein the counter value is incremented in response to requested data for received requests to access data from the set associative cache not being present in the subset of cache lines, and wherein the counter value is decremented in response to requested data for received requests to access data from the set associative cache being present in the subset of cache lines.

18. The computer program product of claim 10, wherein the mode bit is set to a mode bit value corresponding to the first mode in response to the counter value being less than a threshold value, and wherein the mode bit is set to a mode bit value corresponding to the second mode in response to the counter value exceeding a threshold value.

19. An apparatus, comprising:
a processor; and
a set associative cache coupled to the processor, wherein the processor:
receives a request to access data from the set associative cache of the data processing system, the request specifying an address of the data;
identifies a set of cache lines in the set associative cache associated with the address;
determines whether a mode of operation for the set is a first mode of operation or a second mode of operation;
wherein determining whether the mode of operation for the set is the first mode of operation or the second mode of operation is performed by retrieving a mode bit value, of a mode bit corresponding to the set, from a mode bit storage device; and
in response to the mode of operation for the set being the first mode of operation:
determines if there is a cache hit in a subset of cache lines in the set of cache lines without accessing other cache lines in the set of cache lines;
retrieves data from the subset of cache lines in the set of cache lines without accessing the other cache fines in the set of cache lines, if it is determined that there is a cache hit in the subset of cache lines; and
accesses each of the other cache lines in the set of cache lines to determine if there is a cache hit in any of these other cache lines only in response to there being a cache miss in the subset of cache lines.

* * * * *